COMBINATION POWER SUPPLY MODULATOR FOR AN AMPLIFIER

Filed March 8, 1968 2 Sheets-Sheet 1

INVENTOR.
EDUARD H. HUGENHOLTZ
BY
AGENT

COMBINATION POWER SUPPLY MODULATOR FOR AN AMPLIFIER

Filed March 8, 1968 2 Sheets-Sheet 2

INVENTOR.
EDUARD H. HUGENHOLTZ
BY
[signature]
AGENT

United States Patent Office 3,566,308
Patented Feb. 23, 1971

3,566,308
COMBINATION POWER SUPPLY MODULATOR FOR AN AMPLIFIER

Eduard Herman Hugenholtz, Willowdale, Ontario, Canada, assignor, by mesne assignments, to U.S. Philips Corporation, New York, N.Y., a corporation of Delaware Filed Mar. 8, 1968, Ser. No. 711,764
Claims priority, application Canada, Mar. 11, 1967, 985,001
Int. Cl. H03c *1/36, 5/00*
U.S. Cl. 332—31 10 Claims

ABSTRACT OF THE DISCLOSURE

A combination power supply and modulator circuit for a power amplifier features either a silicon controlled rectifier with the modulation signal applied to control the conduction time thereof, or a DC to square wave circuit with the modulation signal controlling the conduction time thereof.

A power supply modulation system wherein a direct current to direct current voltage supersonic frequency converter output voltage is controlled in amplitude by the modulation signal while the controlled output voltage is applied to an anode or collector modulated radio-frequency transmitter stage to produce amplitude modulation of the radio-frequency output.

BACKGROUND OF THE INVENTION

The invention is concerned with the obtaining of high efficiency in amplitude modulation systems of the anode modulated tube or collector modulated transistorized radio-frequency stage types operating in Class C or Class D. Such stages can operate at high efficiency. However, the modulators employed with the modulated stages normally operate as Class A or Class B amplifiers with consequent low efficiency resulting in the overall efficiency of the transmitter being low. In addition the necessary modulation transformer employed is large and expensive.

It is a primary object of the invention to provide a means of obtaining efficiencies in amplitude modulation systems of the anode or collector modulated type which are high in comparison to efficiencies obtainable from known systems.

In accordance with the invention the modulator stage is replaced by a modulation signal controlled variable output power supply. In order to provide the variations of output voltage with modulation signal amplitude a power supply, substantially without capacitor storage effect at modulation frequencies, it is necessary and it has been found that direct current to direct current voltage converters, of the self-oscillating or driven type, can meet this requirement and are suitable for use with portable equipment. A controlled rectifier system can replace the converter where a suitable source of alternating current is available.

In view of the fact that the output voltage of the power supply must vary with the modulation signal amplitude and substantially no capacitive filtering can be used, it is necessary that the operating frequency of the converter or alternating current source be high in comparison to the highest frequency of the modulation signal. When this condition is met a filter for the power supply can be provided which does not substantially attenuate the highest modulation frequencies. The incorporation of such a filter prevents modulation of the transmitter by the power supply ripple.

The power supply output modulation may take one of several forms, for instance, a silicon controlled rectifier system, i.e. phase controlled rectification, or a width modulated square wave fed rectifier system.

The invention will now be described with reference to the drawings in which.

Figure 1:
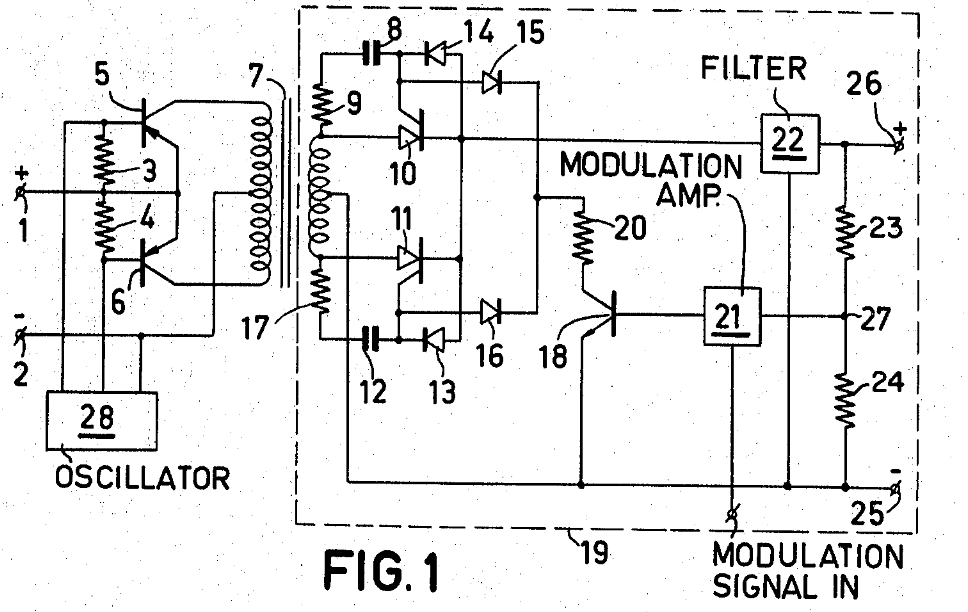
FIG. 1 shows a converter driven silicon controlled rectifier system.

Referring now to FIG. 1, a source of direct current voltage with polarity as indicated, is applied across terminals 1, 2. Two transistors 5, 6 acting as controlled rectifiers, supply the alternating voltage from oscillator 28 to the primary of a transformer 7. Resistors 3 and 4 act as loads across which the switching voltages for transistors 5 and 6 are developed. By driving transistors 5, 6 alternately into saturation and alternating square wave voltage is set up across the primary of transformer 7.

The secondary of transformer 7 is connected to a silicon controlled rectifier (SCR) system comprising two SCR's 10, 11 which by means of coupling networks comprised by resistor-capacitor combinations 8, 9 and 17, 12 are switched into their conductive states by the application of positive voltages to the respective switching electrodes. Diodes 14 and 13 serve to discharge capacitors 8 and 12 respectively between conductive periods. As a consequence of this operation a direct current voltage, positive with respect to terminal 25, is supplied through filter 22 to terminal 26.

The circuit operation described thus far has not taken into account the effect of the modulation amplifier which includes a voltage amplifier shown as a block 21 and a further transistor rectifier control or modulation stage including transistor 18.

Transistor 18 has its emitter electrode connected diectly to negative terminal 25. The operating bias level of transistor 18 is determined by voltage divider 23, 24 whereby the resultant voltage is fed through modulation amplifier 21 to the base electrode of transistor 18. A resistor 20 is connected between the collector of transistor 18 and the cathode electrodes of two diodes 15, 16 the anodes of which are connected to the switching electrodes of SCR's 10, 11 respectively. Diodes 15 and 16 prevent switching on of SCR's 10 and 11 if the direct current potential of terminal 26 is above the potential at which conduction takes place in the collector circuit of transistor 18 which last potential is determined jointly by the potential at point 27 and the voltage added by the modulation signal which is supplied to the base electrode of transistor 18.

This base in turn determines the unmodulated carrier amplitude and is selected to be at the half maximum power point to ensure low distortion for 100% modulation. The direct-current voltage level at the switching electrodes of the SCR's applied by resistor 20 and diodes 15, 16 fixes the zero modulation output voltage level appearing across terminals 25, 26 which is employed as the supply voltage for an amplitude modulated stage, not shown.

The superimposition of a modulation signal on the bias voltage of transistor 18 creates a variation of the conduction versus non-conduction periods of SCR's 10, 11 with a consequent variation in output corresponding in frequency and amplitude to that of the modulation signal. The modulated output voltage (D.C.) provides the necessary transmitter modulation i.e. collector voltage, as will be well understood.

In order that the driving frequency of oscillator 28 does not appear in the output of the transmitter as an amplitude modulation thereof a filter 22 is added. The frequency of oscillator 28 is high as compared to the highest modulation frequency in order that the filter can be provided with a low pass characteristic which does not attenuate the highest modulation frequency to any extent.

It will be seen from the above description that the modulation power required is very low since little power is required to drive or trigger the SCR's 10, 11 and consequently a large saving in power is achieved. In addition a large modulation transformer, necessary for low modulation frequencies, is obviated. The converter efficiency is also very high and overall efficiencies of, at least 90% have been obtained for Class C type modulated stages.

Figure 2:
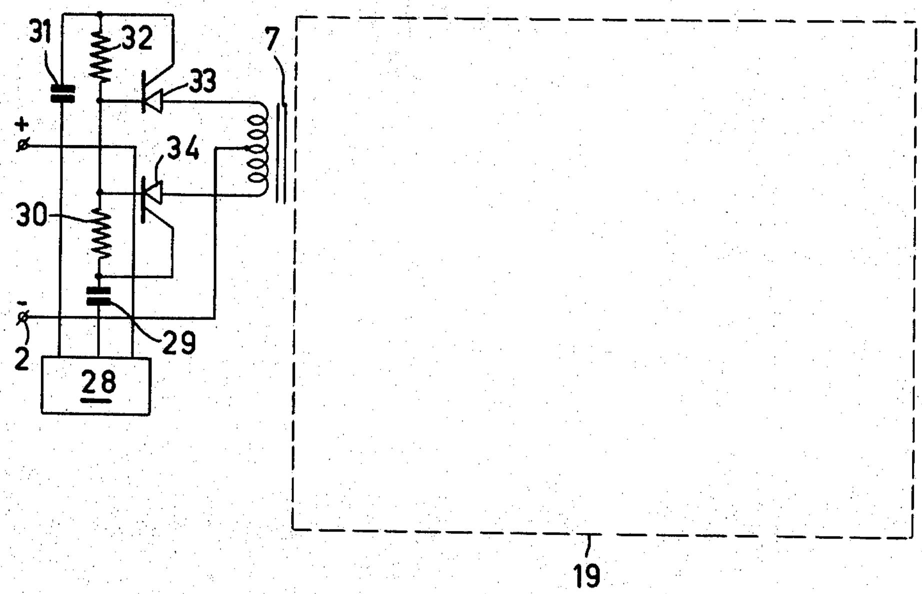
FIG. 2 shows a system similar to that of FIG. 1, using silicon controlled rectifiers in the converter.

Referring now to the circuit of FIG. 2, which is similar to FIG. 1 with the exception that SCR's 33, 34 have replaced transistors 5, 6 the operation of the circuit is substantially identical to that of FIG. 1, the components not shown included in dotted rectangle 19 being the same.

Figure 3:
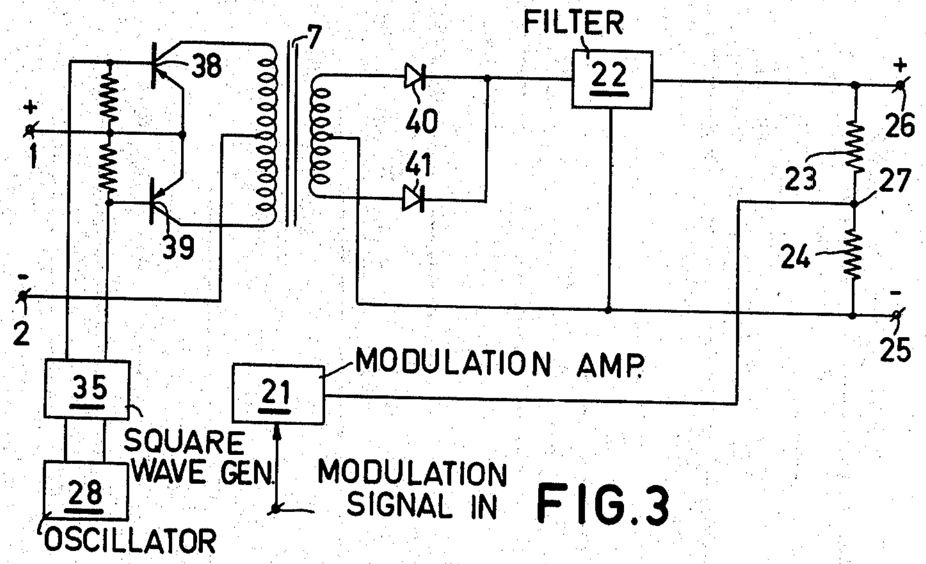
FIG. 3 shows a width modulated square wave source used to drive a conventional full wave rectifier system.

The circuit of FIG. 3 utilizes a width modulated square wave generator as the driving voltage source for transistors 38, 39. The high frequency oscillator 28 drives a square wave generator 35 the output of which is width modulated by the modulation signal amplified and fed thereto by amplifier 21. Switching transistors 38, 39 feed the variable width square wave pulses to transformer 7 which feeds a conventional full wave rectifier comprising diodes 40, 41 and the filter 22. Accordingly the output voltage at terminals 25, 26 will vary in accordance with the modulation signal in amplitude and frequency.

Figure 4:
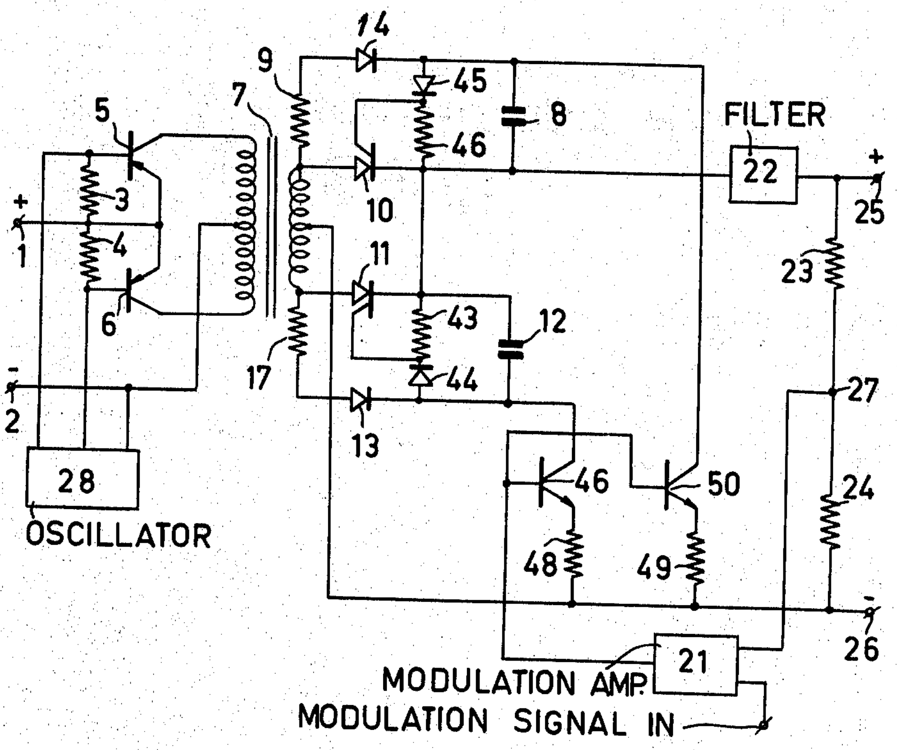
FIG. 4 shows a modified version of the circuit of FIG. 1.

Referring to FIG. 4 a modified version of the circuit of FIG. 1 is shown. The circuit of FIG. 4 is designed to eliminate any erratic firing of the silicon controlled rectifiers which might be encountered with the circuit of FIG. 1 when diodes 15, 16 are switched on while the potentials of the switching electrodes of SCR's 10 and 11 are below the existing direct current potential of terminal 26.

In the circuit of FIG. 4 wherein components similar to those employed in FIG. 1 are similarly designated, the switching voltage is applied to SCR 10 by resistor 9, diodes 14, 45 and resistor 46 to the switching electrode. A capacitor 8 shunts diode 45 and resistor 46 and the potential across capacitor 8 is determined by the state of conduction of transistor 50 which in turn is controlled by the potential at point 27 and the modulation voltage applied by the modulation signal amplifier 21. When the potential across diode 45, resistor 46 and capacitor 8 builds up to exceed the potential of terminal 25 SCR 10 will be switched on. The charge on capacitor 8 will be bled off between conduction periods by transistor 50. Similar action takes place in the circuitry associated with SCR 11 and transistor 47. The maximum modulation signal amplitude is chosen so that the potential across capacitors 8, 12 is substantially zero between respective conduction periods to provide a maximum direct current output voltage.

Although several embodiments of the invention have been shown it will be realized that various modifications may be made which do not depart from the spirit and scope of the present invention. For instance, a self-oscillating converter may replace the driven converter shown in FIG. 1. In addition negative feedback may be employed between the output at terminals 25, 26 and the input modulation signal in order to linearize the modulation.

What is claimed is:

1. A combination power supply and modulator circuit for an amplifier operating at a given carrier frequency comprising, input means for a modulating signal having a given upper frequency limit less than said carrier frequency, input means for receiving direct current, a first translation means for converting the direct current into an alternating current having a frequency greater than the said upper frequency limit and lower than said carrier frequency, second translation means for converting said alternating current into a second direct current for application to the amplifier; and means for varying the intensity of said second direct current in accordance with the frequency and amplitude variations of said modulating signal comprising means for applying said modulating signal to one of said translation means to control the conduction time thereof.

2. A circuit as claimed in claim 1 wherein said second translation means comprises controlled rectifiers and said applying means is coupled to said second translation means.

3. A circuit as claimed in claim 2 wherein said applying means comprises a network including a resistor, a capacitor, and a diode series loop.

4. A circuit as claimed in claim 3 further comprising means for preventing the conduction within said controlled rectifiers when the potential of said second direct current exceeds the potential of the modulating signal plus a selected potential.

5. A circuit as claimed in claim 4 wherein said preventing means comprises diodes.

6. A circuit as claimed in claim 1 wherein said first translation means further comprises an oscillator.

7. A circuit as claimed in claim 6 wherein said first translation means comprises controlled rectifiers and a square wave generator, said square wave generator having inputs coupled to said oscillator and said applying means for pulse width modulation thereof, and having an output coupled to said controlled rectifiers.

8. A circuit as claimed in claim 1 further comprising means to filter the output of said second translation means.

9. A circuit as claimed in claim 1 further comprising means for biasing said applying means coupled to the output of said second translation means to receive said second direct current whereby the resultant feedback reduces distortion and said potential of said second direct current is at a selected value when no modulation signal is present.

10. A combination power supply and modulator circuit for an amplifier operating at a given carrier frequency comprising, input means for a modulating signal having a given upper frequency limit less than said carrier frequency, input means for receiving alternating current, controlled rectifier means for converting said alternating current into a direct current for application to the amplifier; and means for varying the intensity of said direct current in accordance with the frequency and amplitude variations of said modulating signal comprising means for applying said modulating signal to said controlled rectifier means to control the conduction time thereof.

References Cited

UNITED STATES PATENTS

| | | | |
|---|---|---|---|
| 3,025,418 | 3/1962 | Brahm | 307—252 |
| 3,166,722 | 1/1965 | Reid | 332—63X |
| 3,183,430 | 5/1965 | Schonholzer | 307—252X |
| 3,202,940 | 8/1965 | Dietrich | 332—43(B) |
| 3,293,449 | 12/1966 | Gutzwiller | 307—252 |
| 3,305,796 | 2/1967 | Somer et al. | 332—43(B) |
| 3,386,053 | 5/1968 | Priddy | 329—101X |
| 3,311,835 | 3/1967 | Richman | 328—26X |

ALFRED L. BRODY, Primary Examiner

U.S. Cl. X.R.

307—252, 284; 332—17, 59